United States Patent
Yoon et al.

(10) Patent No.: US 10,600,391 B2
(45) Date of Patent: Mar. 24, 2020

(54) APPARATUS AND METHOD OF MANAGING DISPLAY

(71) Applicant: HANWHA TECHWIN CO., LTD., Seongnam-si (KR)

(72) Inventors: Hyun Kyoung Yoon, Changwon-si (KR); In Beom Yoo, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 15/556,510

(22) PCT Filed: Mar. 20, 2017

(86) PCT No.: PCT/KR2017/002931
§ 371 (c)(1),
(2) Date: Sep. 7, 2017

(87) PCT Pub. No.: WO2017/175988
PCT Pub. Date: Oct. 12, 2017

(65) Prior Publication Data
US 2018/0166048 A1    Jun. 14, 2018

(30) Foreign Application Priority Data
Apr. 5, 2016    (KR) .................. 10-2016-0041706

(51) Int. Cl.
*G09G 5/391*    (2006.01)
*H04N 19/40*    (2014.01)
(Continued)

(52) U.S. Cl.
CPC .......... *G09G 5/391* (2013.01); *G06F 3/1423* (2013.01); *H04N 19/127* (2014.11);
(Continued)

(58) Field of Classification Search
CPC .......... G09G 5/00; G09G 5/005; G09G 5/391; G06F 3/14; H04N 19/40; H04N 21/4363;
(Continued)

(56) References Cited

U.S. PATENT DOCUMENTS 7,659,922 B2 *    2/2010    Black ............... G08B 13/19656
                                                                    348/143
9,143,759 B2 *    9/2015    Choi ...................... H04N 7/181
(Continued)

FOREIGN PATENT DOCUMENTS

KR    10-2005-0078398 A    8/2005
KR    10-2009-0061710 A    6/2009
(Continued)

OTHER PUBLICATIONS

International Search Report, issued by International Searching Authority in corresponding International Application No. PCT/KR2017/002931, dated May 23, 2017, (PCT/ISA/210).
(Continued)

*Primary Examiner* — Sardis F Azongha
(74) *Attorney, Agent, or Firm* — Sughrue Mion, PLLC (57) ABSTRACT

An embodiment of the present invention discloses a method and apparatus for managing display. A method of managing display according to an embodiment of the present invention may include: obtaining display device information including an operation state and a maximum display resolution of each of one or more connection display devices that are sensed to be connected; detecting one or more operation display devices that are operating display devices from among the one or more connection display devices, by referring to the display device information; and determining a resource allocation coefficient of each of the one or more operation display devices, based on at least one of a maximum display resolution of each of the one or more operation display devices and a number of display channels of each of the one or more operation display devices.

20 Claims, 3 Drawing Sheets

(51) Int. Cl.
*H04N 19/127* (2014.01)
*H04N 19/164* (2014.01)
*G06F 3/14* (2006.01)

(52) U.S. Cl.
CPC .......... *H04N 19/164* (2014.11); *H04N 19/40* (2014.11); *G09G 2330/021* (2013.01); *G09G 2340/0407* (2013.01); *G09G 2360/08* (2013.01); *G09G 2370/04* (2013.01); *G09G 2370/20* (2013.01); *G09G 2370/22* (2013.01)

(58) Field of Classification Search
CPC ............ H04N 7/01; H04N 7/18; H04N 7/181; H04N 7/24; H04N 7/173; G06T 3/40
See application file for complete search history.

(56) References Cited

U.S. PATENT DOCUMENTS

| | | | | |
|---|---|---|---|---|
| 9,489,387 | B2* | 11/2016 | Marlatt | G06F 17/30085 |
| 9,832,342 | B2* | 11/2017 | Cai | H04N 1/00095 |
| 9,854,301 | B2* | 12/2017 | Nakamura | H04N 21/44209 |
| 2003/0067543 | A1* | 4/2003 | Okada | H04N 7/181 |
| | | | | 348/207.1 |
| 2005/0116838 | A1* | 6/2005 | Bachelder | G08G 1/0175 |
| | | | | 340/937 |
| 2005/0156869 | A1* | 7/2005 | Mori | H04N 5/44 |
| | | | | 345/104 |
| 2005/0169546 | A1 | 8/2005 | Shin et al. | |
| 2007/0107029 | A1* | 5/2007 | Monroe | H04N 7/181 |
| | | | | 725/105 |
| 2011/0007130 | A1* | 1/2011 | Park | H04N 5/232 |
| | | | | 348/38 |
| 2011/0058036 | A1* | 3/2011 | Metzger | H04N 7/181 |
| | | | | 348/143 |
| 2011/0242317 | A1* | 10/2011 | Wengrovitz | H04N 7/181 |
| | | | | 348/143 |
| 2013/0141543 | A1 | 6/2013 | Choi et al. | |
| 2014/0049655 | A1* | 2/2014 | Iwasaki | H04N 7/18 |
| | | | | 348/207.1 |
| 2014/0119675 | A1 | 5/2014 | Kim et al. | |
| 2017/0019643 | A1* | 1/2017 | Nakanishi | H04N 7/18 |
| 2017/0070657 | A1* | 3/2017 | Yokomizo | G06F 11/00 |
| 2017/0208348 | A1* | 7/2017 | Cheng | H04N 21/2387 |

FOREIGN PATENT DOCUMENTS

| | | |
|---|---|---|
| KR | 10-1347871 B1 | 1/2014 |
| KR | 10-2014-0054518 A | 5/2014 |

OTHER PUBLICATIONS

Communication issued by International Searching Authority in corresponding International Application No. PCT/KR2017/002931, dated May 23, 2017, (PCT/ISA/220).

Written Opinion, issued by International Searching Authority in corresponding International Application No. PCT/KR2017/002931, dated May 23, 2017, (PCT/ISA/237).

* cited by examiner

APPARATUS AND METHOD OF MANAGING DISPLAY

TECHNICAL FIELD

Embodiments of the present invention relate to an apparatus and method of managing display.

BACKGROUND ART

Many surveillance cameras have been installed everywhere these days and technologies for recording, storing, and transmitting images obtained by surveillance cameras have been developed.

In particular, as the number of installed surveillance cameras has increased, multi-channel monitoring devices for receiving images from a plurality of cameras and monitoring areas to be monitored have been actively developed.

Images obtained by a plurality of surveillance cameras are generally displayed on a plurality of display devices. Even when one of the plurality of display devices does not operate, decoding may be performed on an image displayed on the display device, thereby using unnecessary resources.

DETAILED DESCRIPTION OF THE INVENTION

Technical Problem

The present invention has been made to solve the above-described problems, and an objective of the present invention is to provide an apparatus and a method that may prevent occupation of unnecessary resources by dynamically controlling the amount of resources allocated to each display device based on information about the display device, and thus may reduce energy consumption, reduce heat generation, and increase a lifespan of the apparatus.

Also, an objective of the present invention is to provide an apparatus and method that may more efficiently use resources of an apparatus for managing display and more comfortably operate a network environment, and may increase even a lifespan of an image acquisition device by controlling the image acquisition device if necessary.

Technical Solution

A method of managing display according to an embodiment of the present invention may include: obtaining display device information including an operation state and a maximum display resolution of each of one or more connection display devices that are sensed to be connected; detecting one or more operation display devices that are operating display devices from among the one or more connection display devices, by referring to the display device information; and determining a resource allocation coefficient of each of the one or more operation display devices, based on at least one of the maximum display resolution of each of the one or more operation display devices and a number of display channels of each of the one or more operation display devices.

After the determining of the resource allocation coefficient, the method may further include: allocating decoding resources to each of the one or more operation display devices to be proportional to the determined resource allocation coefficient; and decoding images received from one or more image acquisition devices by using the decoding resources.

The determining of the resource allocation coefficient may include determining the resource allocation coefficient so that the resource allocation coefficient increases as the maximum display resolution of each of the one or more operation display devices increases. Also, the determining of the resource allocation coefficient may include determining the resource allocation coefficient so that the resource allocation coefficient increases as the number of display channels of each of the one or more operation display devices increases.

The obtaining of the display device information may include obtaining the display device information at predetermined time intervals, the detecting of the one or more operation display devices includes detecting the one or more operation display devices by referring to the display device information obtained at the predetermined time intervals, and the determining of the resource allocation coefficient includes determining the resource allocation coefficient of each of the one or more operation display devices detected at the predetermined time intervals.

After the determining of the resource allocation coefficient, the method may further include controlling image acquisition devices, wherein the controlling of the image acquisition devices includes: checking a channel displayed on at least one of a connection stop display device whose connection is sensed to be stopped in the obtaining of the display device information and an operation stop display device whose operation is detected to be stopped in the detecting of the one or more operation display devices; and transmitting a signal for stopping image transmission of any of the image acquisition devices that transmits an image of the checked channel, to the image acquisition device.

The image acquisition device may transmit an image of a first channel at a first resolution and a second resolution, and after the determining of the resource allocation coefficient, the method further includes displaying an image of the first resolution on a first operation display device and storing an image of the second resolution in an image storage unit.

When the first operation display device is at least one of the connection stop display device and the operation stop display device, the transmitting of the signal for stopping the image transmission to the image acquisition device includes transmitting a signal for stopping transmission of the image of the first resolution and the image of the second resolution and a signal for transmitting the image of the first channel at a third resolution, wherein the storing in the image storage unit includes storing an image of the third resolution in the image storage unit, wherein the third resolution is higher than the second resolution.

After the determining of the resource allocation coefficient, the method further includes controlling image acquisition devices, wherein the controlling of the image acquisition devices includes: checking a channel displayed on at least one of a new connection display device that is sensed to be newly connected in the obtaining of the display device information and an operation start display device whose operation is detected to start in the detecting of the one or more operation display devices; and transmitting a signal for starting image transmission of any of the image acquisition devices that transmits an image of the checked channel to the image acquisition device.

An image acquisition device may transmit an image of a first channel at one or more resolutions, wherein after the determining of the resource allocation coefficient, the method further includes determining a display image, wherein the determining of the display image includes: checking a display resolution of the first channel in each of the one or more operation display devices; and determining an image of the first channel having a smallest resolution difference from the display resolution from among images of the first channel having the one or more resolutions as a display image of the first channel.

An apparatus for managing display according to an embodiment of the present invention may include: a display device sensor configured to obtain display device information including an operation state and a maximum display resolution of each of one or more connection display devices that are sensed to be connected; an operation display device detector configured to detect one or more operation display devices that are operating display devices from among the one or more connection display devices, by referring to the display device information; and a resource allocation coefficient determiner configured to determine a resource allocation coefficient of each of the one or more operation display devices, based on at least one of a maximum display resolution of each of the one or more operation display devices and a number of display channels of each of the one or more operation display devices.

The apparatus may further include: a decoding resource allocator configured to allocate decoding resources to each of the one or more operation display devices to be proportional to the determined resource allocation coefficient; and a decoder configured to decode images received from one or more image acquisition devices by using the decoding resources.

The resource allocation coefficient determiner may be further configured to determine the resource allocation coefficient so that the resource allocation coefficient increases as the maximum display resolution of each of the one or more operation display devices increases. Also, the resource allocation coefficient determiner may be further configured to determine the resource allocation coefficient so that the source distribution coefficient increases as the number of display channels of each of the one or more operation display devices increases.

The display device sensor may be further configured to obtain the display device information at predetermined time intervals, the operation display device detector is further configured to detect the one or more operation display devices by referring to the display device information obtained at the predetermined time intervals, and the resource allocation coefficient determiner is further configured to determine the resource allocation coefficient of each of the one or more operation display devices detected at the predetermined time intervals.

The apparatus may further include an image acquisition device controller configured to check a channel displayed on at least one of a connection stop display device whose connection is sensed by the display device sensor to be stopped and an operation stop display device whose operation is detected by the operation display device detector to be stopped, and transmit a signal for stopping image transmission of any of the one or more image acquisition device that transmits an image of the checked channel to the image acquisition device.

The image acquisition device may transmit an image of a first channel at a first resolution and a second resolution, wherein the apparatus displays an image of the first resolution on a first operation display device and stores an image of the second resolution in an image storage unit.

When the first operation display device is at least one of the connection stop display device and the operation stop display device, the image acquisition device controller may be further configured to transmit a signal for stopping transmission of the image of the first resolution and the image of the second resolution and a signal for transmitting the image of the first channel at a third resolution, wherein the apparatus stores an image of the third resolution in the image storage unit, wherein the third resolution is higher than the second resolution.

The apparatus may further include an image acquisition device controller configured to check a channel displayed on at least one of a new connection display device that is sensed by the display device sensor to be newly connected and an operation start display device whose operation is detected to start by the operation display device detector, and transmit a signal for starting image transmission of any of the one or more image acquisition devices that transmits an image of the checked channel to the image acquisition device.

An image acquisition device may transmit an image of a first channel at one or more resolutions, wherein the apparatus further includes a display image determiner configured to check a display resolution of the first channel in each of the one or more operation display devices, and determine an image of the first channel having a smallest resolution difference from the display resolution from among images of the first channel having the one or more resolutions as a display image of the first channel.

Additional aspects, features, and advantages will be apparent from the following drawings, claims, and detailed description of the invention.

Advantageous Effects of the Invention

According to embodiments of the present invention, an apparatus and method may prevent occupation of unnecessary resources by dynamically controlling the amount of resources allocated to each display device based on information about the display device, and thus may reduce energy consumption, reduce heat generation, and increase a lifespan of the apparatus.

Also, according to the present invention, an apparatus and method may more efficiently use resources of an apparatus for managing display and more comfortably operate a network environment, and may increase even a lifespan of an image acquisition device by controlling the image acquisition device if necessary.

BEST MODE

A method of managing display according to an embodiment of the present invention may include: obtaining display device information including an operation state and a maximum display resolution of each of one or more connection display devices that are sensed to be connected; detecting one or more operation display devices that are operating display devices from among the one or more connection display devices, by referring to the display device information; and determining a resource allocation coefficient of each of the one or more operation display devices, based on at least one of a maximum display resolution of each of the one or more operation display devices and a number of display channels of each of the one or more operation display devices.

Mode of the Invention

As the invention allows for various changes and numerous embodiments, exemplary embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of the related art are omitted when it is deemed that they may unnecessarily obscure the essence of the invention.

While such terms as "first", "second", etc., may be used to describe various components, such components must not be limited to the above terms. The above terms are used only to distinguish one component from another.

The terms used in the present specification are merely used to describe exemplary embodiments, and are not intended to limit the present invention. An expression used in the singular encompasses the expression of the plural, unless it has a clearly different meaning in the context. In the present specification, it is to be understood that the terms such as "including", "having", and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The present invention may be described in terms of functional block components and various processing steps. Such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices.

Similarly, where the elements of the present invention are implemented using software programming or software elements, the invention may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present invention could employ any number of conventional techniques for electronics configuration, signal processing, and/or data processing. The words "mechanism", "element", "means", and "configuration" are used broadly and are not limited to mechanical or physical embodiments, but can include software routines in conjunction with processors, etc.

Figure 1:
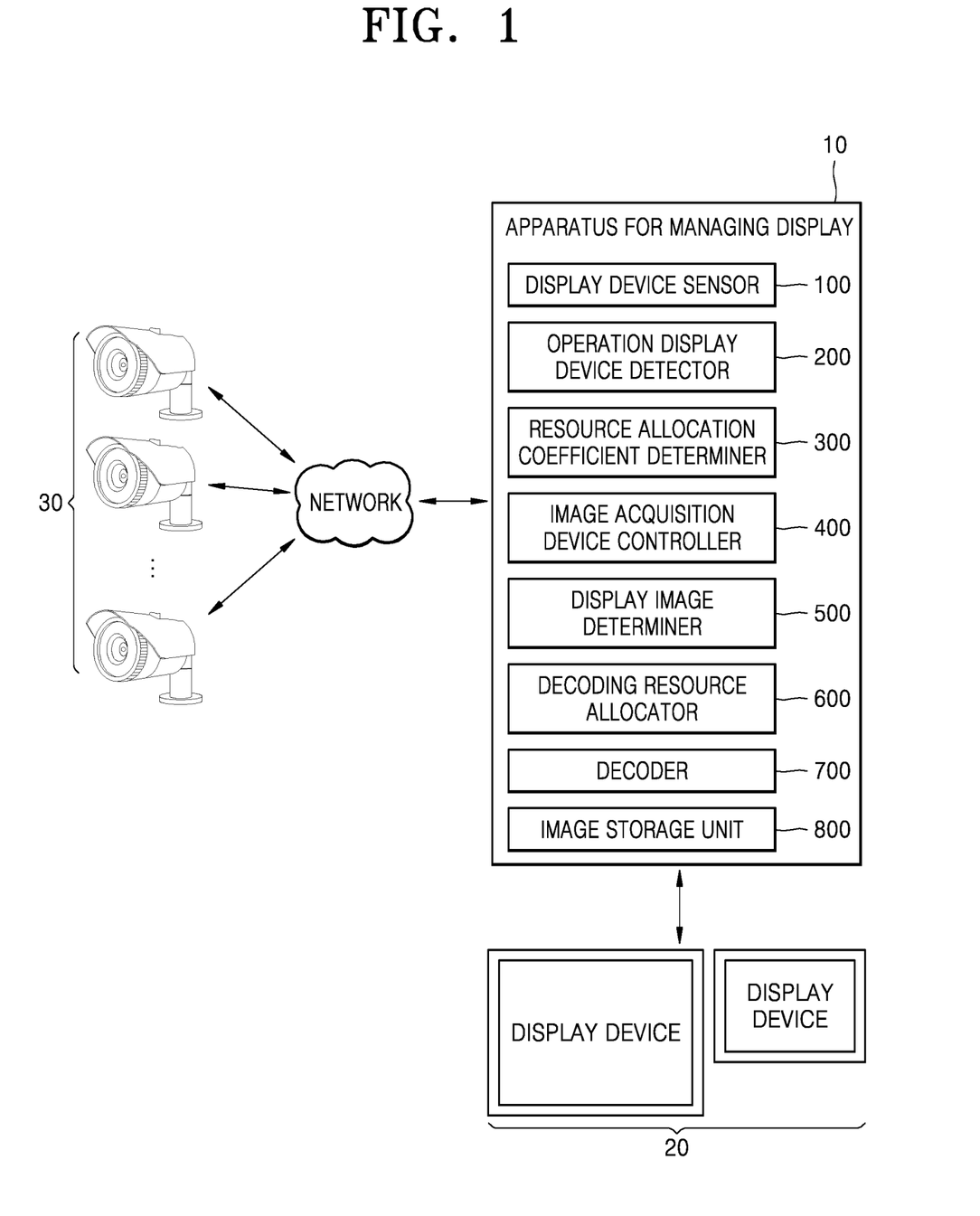
FIG. 1 illustrates a system for managing display according to an embodiment of the present invention.

FIG. 1 illustrates a system for managing display according to an embodiment of the present invention.

Referring to FIG. 1, the system according to an embodiment of the present invention may include an apparatus 10 for managing display, a display device 20, an image acquisition device 30, and a network through which the apparatus 10 and the image acquisition device 30 are connected to each other.

The display device 20 according to an embodiment of the present invention may refer to a display device on which figures, characters, or a combination thereof are displayed according to an electrical signal generated by the apparatus 10. For example, the display device 20 may include any one from among, but is not limited to, a cathode ray tube (CRT), a liquid crystal display (LCD), a plasma display panel (PDP), and an organic light-emitting diode (OLED).

The display device 20 and the apparatus 10 may be connected to each other according to any of various image connection methods. For example, the display device 20 and the apparatus 10 may be connected to each other according to the high-definition multimedia interface (HDMI) standard. In this case, the apparatus 10 may obtain information about the display device 20 by checking extended display identification data (EDID) or a hot plug detect signal of an HDMI link connected to the display device 20. Alternatively, the display device 20 and the apparatus 10 may be connected to each other according to any one of digital video interactive (DVI), D-SUB (RGB), and S-Video.

Furthermore the display device 320 and the apparatus 10 may be connected to each other through a network. Although the display device 20 is directly connected to the apparatus 10 in FIG. 1, the display device 20 may receive image data from the apparatus 10 through the network.

One or more display devices 20 may be provided according to a configuration of the system, and when a plurality of the display devices 20 are provided, screen sizes and maximum display resolutions of the plurality of display devices 20 may be different from one another.

The image acquisition device (e.g., a surveillance camera) 30 according to an embodiment of the present invention may transmit an obtained image to the apparatus 10 through the network as described above. In this case, the image acquisition device 30 may include a lens and an image sensor. The lens may be a lens group including one or more lenses. The image sensor may convert an image input by the lens into an electrical signal. For example, the image sensor may be a semiconductor device for converting an optical signal into an electrical signal (hereinafter, referred to as an image), for example, a charge-coupled device (CCD) or a complementary metal-oxide-semiconductor (CMOS).

The image acquisition device 30 may be a camera for providing an RGB image of a space to be imaged, an infrared image, or a distance image including distance information.

The image acquisition device 30 may transmit an obtained image at one or more resolutions to the apparatus 10. For example, the image acquisition device 30 may transmit the same image at a QVGA (320×240) resolution, a HD (1920×1080) resolution, and a UHD (3840×2160) resolution to the apparatus 10. The apparatus 10 may select any one from among the QVGA, HD, and UHD resolutions as a resolution of a source image of an image displayed on the display device 20, according to the display device 20 on which the image is displayed, which will be explained below in detail.

In the present invention, one or more image acquisition devices 30 may be provided. When a plurality of the image acquisition devices 30 are provided, an image obtained by each of the image acquisition devices 30 may be treated as a channel.

Examples of the network described in the present invention may include, but are not limited to, a wireless network, a wired network, a public network such as the Internet, a private network, a global system for mobile communication (GSM) network, a general packet radio network (GPRN), a local area network (LAN), a wide area network (WAN), a metropolitan area network (MAN), a cellular network, a public switched telephone network (PSTN), a personal area network, Bluetooth, Wi-Fi Direct, near-field communication, ultra-wide band, a combination thereof, and other networks.

The apparatus 10 according to an embodiment of the present invention may include a display device sensor 100, an operation display device detector 200, a resource allocation coefficient determiner 300, an image acquisition device controller 400, a display image determiner 500, a decoding resource allocator 600, a decoder 700, and an image storage unit 800.

The display device sensor 100 may obtain display device information including an operation state and a maximum display resolution of each of one or more connection display devices that are sensed to be connected.

The operation display device detector 200 may detect one or more operation display devices that are operating display devices from among the one or more connection display devices, by referring to the display device information obtained by the display device sensor 100.

The resource allocation coefficient determiner 300 may determine a resource allocation coefficient of each of the one or more operation display devices, based on at least one of a maximum display resolution of each of the one or more operation display devices and the number of display channels of each of the one or more operation display devices.

The image acquisition device controller 400 may check a channel displayed on at least one of a display device sensed by the display device sensor 100 and a display device detected by the operation display device detector 200, and may transmit a signal for controlling the image acquisition device 30 that transmits an image of the checked channel to the image acquisition device 30.

The display image determiner 500 may check a display resolution of a first channel in an operation display device and may determine an image of the first channel having a smallest resolution difference from a display resolution from among images of the first channel having one or more resolutions as a display image of the first channel.

The decoding resource allocator 600 may allocate decoding resources of each of the one or more operation display devices to be proportional to the resource allocation coefficient determined by the resource allocation coefficient determiner 300.

The decoder 700 may decode images received from the one or more image acquisition devices 30 by using the decoding resources allocated by the decoding resource allocator 600.

The image storage unit 800 may store the images received from the one or more image acquisition devices 30.

Figure 2:
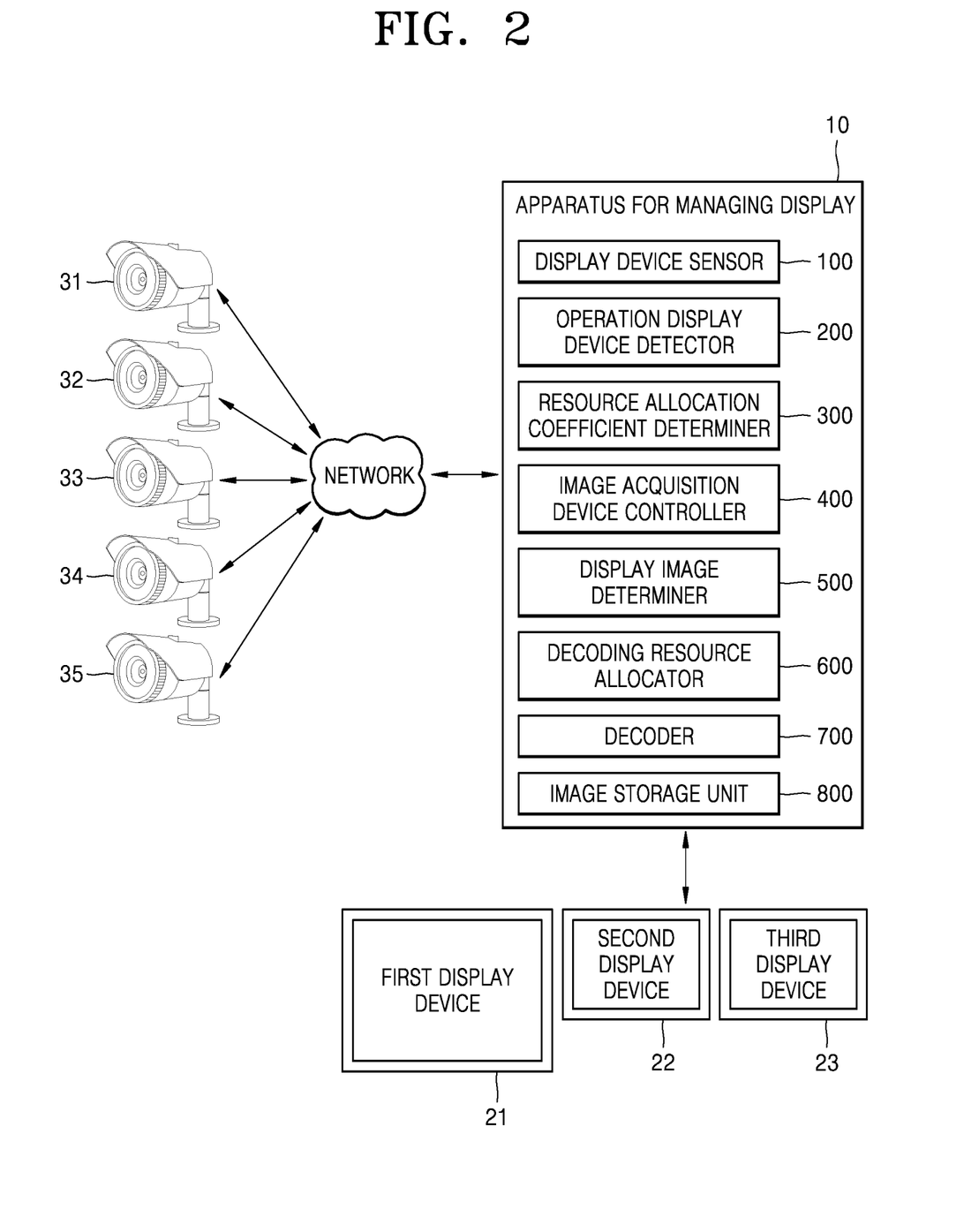
FIG. 2 illustrates a configuration of a system for managing display according to an embodiment of the present invention.

FIG. 2 illustrates a configuration of a system for managing display according to an embodiment of the present invention.

Referring to FIG. 2, it is assumed that the system includes the apparatus 10, three display devices, that is, first through third display devices 21 through 23, and five image acquisition devices 31 through 35.

Also, it is assumed that the apparatus 10 and the image acquisition devices 31 through 35 are connected to each other through a network, and the apparatus 10 and the first through third display devices 21 through 23 are directly connected to each other.

It is assumed that the first display device 21 and the second display device 22 are operating and the third display device 23 is not operating.

Although the following is explained on the assumption that the system according to an embodiment of the present invention is configured as shown in FIG. 2, the spirit and scope of the present invention is not limited thereto.

The display device sensor 100 according to an embodiment of the present invention may obtain display device information including an operation state and a maximum display resolution of each of the first through third display devices 21 through 23 that are one or more connection display devices sensed to be connected.

When a "display device is connected" in the present invention, it may mean that the display device is electrically connected to the apparatus 10. For example, when the first through third display devices 21 through 23 and the apparatus 10 are connected to each other according to an HDMI method, the display device sensor 100 may determine whether the first through third display devices 21 through 23 are connected according to whether EDID information or input information of a hot plug detect pin is received.

The term "connection display device" in the present invention may refer to a display device that is sensed by the display device sensor 100 to be connected. Accordingly, in FIG. 2, the display device sensor 100 may sense the first display device 21, the second display device 22, and the third display device 23 as connection display devices.

The display device sensor 100 may obtain display device information about each connection display device from each of the first through third display devices 21 through 23. For example, the display device sensor 100 may obtain display device information by checking EDID of each of the first through third display devices 21 through 23. In this case, the EDID may include information about a manufacturer, a product identification mark, a color feature, a display resolution, and an operation state of each display device.

In FIG. 2, the display device sensor 100 may obtain display device information of each of the first display device 21, the second display device 22, and the third display device 23 from each of the first through third display devices 21 through 23. In this case, the display device information may include information about an operation state and information about a maximum display resolution of each of the first through third display devices 21 through 23.

The operation display device detector 200 according to an embodiment of the present invention may detect one or more operation display devices that are operating display devices from among the one or more connection display devices, by referring to the display device information obtained by the display device sensor 100.

The term "operation display device" in the present invention may refer to a display device that is capable of displaying a current screen from among the "connection display devices".

In FIG. 2, since the first display device 21 and the second display device 22 are operating and the third display device 23 is not operating as described above, the operation display device detector 200 may detect the first display device 21 and the second display device 22 as operation display devices.

The resource allocation coefficient determiner 300 according to an embodiment of the present invention may determine a resource allocation coefficient of each of the one or more operation display devices, by referring to the display device information of the one or more operation display devices detected by the operation display device detector 200.

The term "resource allocation coefficient" in the present invention may refer to a ratio of resources allocated for screen display of a display device corresponding to a coefficient. In this case, the allocated resources may be used to decode an image received from an image acquisition device. The term "resources" may refer to available extra performance and/or space of a processor, a memory, and a buffer. Frames per second (FPS) of an image displayed on a display device, the number of channels, and a display resolution of each channel may be adjusted according to the allocation of such resources.

The resource allocation coefficient determiner 300 may determine a resource allocation coefficient by using any of various methods.

For example, the resource allocation coefficient determiner 300 may determine a resource allocation coefficient of operation display so that the resource allocation coefficient increases as a maximum display resolution of each operation display device increases.

For example, it is assumed that the operation display device detector 200 detects the first display device 21 and the second display device 22 as operation display devices and a resolution of the first display device 21 is four times higher than a resolution (area ratio) of the second display device 22.

In this case, the resource allocation coefficient determiner 300 may determine that a resource allocation coefficient of the first display device 21 is 0.8 and may determine that a resource allocation coefficient of the second display device 22 is 0.2.

The term "resolution" in the present invention refers to "the total number of pixels that represent an image", and may be expressed as "the number of horizontal pixels X the number of vertical pixels" or "the total number of pixels". Furthermore, "n times a resolution" refers to n times an area ratio. For example, when a resolution of the first display device 21 is four times a resolution of the second display device 22, the number of horizontal pixels of the first display device 21 may be two times greater than the number of horizontal pixels of the second display device 22 and the number of vertical pixels of the first display device 21 may be two times greater than the number of vertical pixels of the second display device 22.

The resource allocation coefficient determiner 300 may determine a resource allocation coefficient of operation display so that the resource allocation coefficient increases as the number of channels displayed on each operation display device increases.

For example, it is assumed that the operation display device detector 200 detects the first display device 21 and the second display device 22 as operation display devices, and four channels are displayed on the first display device 21 and one channel is displayed on the second display device 22.

In this case, the resource allocation coefficient determiner 300 may determine that a resource allocation coefficient of the first display device 21 is 0.8 and a resource allocation coefficient of the second display device 22 is 0.2.

The term "channel" in the present invention may refer to an image obtained by each of the image acquisition devices 31 through 35 as described above.

Furthermore, the resource allocation coefficient determiner 300 may determine a resource allocation coefficient of operation display by considering both a maximum display resolution of each operation display device and the number of channels displayed on each operation display device.

For example, it is assumed that the operation display device detector 200 detects the first display device 21 and the second display device 22 as operation display devices, and a resolution of the first display device 21 is four times higher than a resolution (area ratio) of the second display device 22. Also, it is assumed that one channel is displayed on the first display device 21 and four channels are displayed on the second display device 22.

In this case, the resource allocation coefficient determiner 300 may determine that a resource allocation coefficient of the first display device 21 is 0.5 and a resource allocation coefficient of the second display device 22 is 0.5.

As such, according to the present invention, since resources are flexibly allocated to each operation display device in consideration of a display resolution and/or the number of display channels, an image having higher quality may be displayed.

When an operation of any one operation display device is stopped, the resource allocation coefficient determiner 300 according to another embodiment of the present invention may minimize a resource allocation coefficient of the operation display device whose operation is stopped.

For example, when a display device does not operate due to entrance to a standby mode or the like, occupation of unnecessary resources may be prevented by causing a resource allocation coefficient of the display device that does not operate to be 0. In this case, resource allocation coefficients of display devices other than the display device that does not operate are kept the same, thereby reducing the use of resources. It will be understood that when the display device changes to an operation state again, a resource allocation coefficient may be determined by using the above-described method.

The apparatus 10 according to an embodiment of the present invention may repeatedly perform the above operation at predetermined time intervals. In other words, the display device sensor 100 according to an embodiment of the present invention may obtain display device information at predetermined time intervals. Also, the operation display device detector 200 may detect an operation display device by referring to the display device information obtained by the display device sensor 100 at predetermined time intervals. Also, the resource allocation coefficient determiner 300 may determine a resource allocation coefficient of the operation display device detected by the operation display device detector 200 at predetermined time intervals.

In this case, the image acquisition device controller 400 according to an embodiment of the present invention may check a channel displayed on at least one of a display device whose change is sensed by the display device sensor 100 and a display device whose change is sensed by the operation display device detector 200. Also, the image acquisition device controller 400 may transmit a signal for controlling any of the image acquisition devices 31 through 35 that transmits an image of the checked channel to the image acquisition device.

For example, the image acquisition device controller 400 may check a channel displayed on at least one of a connection stop display device whose connection is sensed by the display device sensor 100 to be stopped and an operation stop display device whose operation is sensed by the operation display device detector 200 to be stopped. Also, the image acquisition device controller 400 may transmit a signal for stopping image transmission of an image acquisition device that transmits an image of the checked channel to the image acquisition device.

For example, it is assumed that the operation display device detector 200 detects the first display device 21 and the second display device 22 as operation display devices at a first time and the operation display device detector 200 detects only the first display device 21 as an operation display device at a second time that is later than the first time. In other words, it is assumed that the operation display device detector 200 detects the second display device 22 as an operation stop display device at the second time. Also, it is assumed that a channel of an image obtained by the image acquisition device 35 is displayed on the second display device 22 at the first time.

In this case, the image acquisition device controller 400 may check a channel of an image displayed on the second display device 22, that is, a channel on which an image obtained by the image acquisition device 35 is displayed, and may transmit a signal for stopping image transmission to the image acquisition device 35.

When the image acquisition devices 31 through 35 transmit the same image at a plurality of resolutions, the image acquisition device controller 400 may transmit a signal for stopping only transmission of an image corresponding to an image displayed on a display device.

For example, it is assumed that the image acquisition device 35 transmits an image of a first channel at a first resolution and a second resolution at a first time, and the apparatus 10 displays an image of the first resolution on the second display device 22 and stores an image of the second resolution in the image storage unit 800. Also, it is assumed that the second display device 22 becomes at least one of a connection stop display device and an operation stop display device at a second time that is later than the first time.

In this case, the image acquisition device controller 400 may transmit a signal for stopping transmission of the image of the first resolution and the image of the second resolution and a signal for transmitting the image of the first channel at a third resolution, to the image acquisition device 35. In this case, the third resolution may be higher than the second resolution. Also, the image acquisition device controller 400 may store an image of the third resolution in the image storage unit 800.

As such, while the same image is displayed and stored, the image may not need to be displayed. In this case, resources of the apparatus 10 may be more efficiently used and an image having higher quality may be stored by increasing a resolution of storage.

The image acquisition device controller 400 may check a channel displayed on at least one of a new connection display device that is sensed by the display device sensor 100 to be newly connected and an operation start display device whose operation is sensed to start by the operation display device detector 200. Also, the image acquisition device controller 400 may transmit a signal for starting image transmission of an image acquisition device that transmits an image of the checked channel to the image acquisition device.

Accordingly, according to the present invention, resources of the apparatus 100 may be more efficiently used and a network environment may be more comfortably operated. Also, according to the present invention, since an image acquisition device is also controlled if necessary, a lifespan of the image acquisition device may be increased and electrical energy consumption may be reduced.

The display image determiner 500 according to an embodiment of the present invention may check a display resolution of a first channel in an operation display device. Also, the display device image determiner 500 may determine an image of the first channel having a smallest resolution difference from the checked display resolution from among images of the first channel having one or more resolutions transmitted by an image acquisition device as a display image of the first channel.

For example, it is assumed that a maximum display resolution of the first display device 21 is a UHD resolution and channels of images obtained by the image acquisition devices 31 through 34 are displayed as four quarters on the first display device 21. Also, it is assumed that the image acquisition devices 31 through 34 transmit the obtained images at a UHD resolution, a QHD resolution, and an FHD resolution.

In this case, the display image determiner 500 may check that each channel an image obtained by each of the image acquisition devices 31 through 34 is displayed at the FHD resolution on the first display device 21, and thus may determine that an image transmitted at the FHD resolution from among images transmitted by the image acquisition devices 31 through 34 is a display image.

As such, since the present invention interoperates with an image acquisition device, the loss of additional resources due to a change in a resolution may be avoided and deterioration of a display screen may be prevented.

The decoding resource allocator 600 according to an embodiment of the present invention may allocate decoding resources to be proportional to a resource allocation coefficient determined for each of one or more operation display devices. Also, the decoder 700 may decode an image received from each of one or more image acquisition devices by using the allocated decoding resources.

When "decoding resources are allocated" in the present invention, it may mean that a processor resource, a memory space, and a buffer needed to decode and display an image received from an input acquisition device on a display device are allocated.

For example, it is assumed that a resource allocation coefficient of the first display device 21 is 0.8 and a resource allocation coefficient of the second display device 22 is 0.2. In this case, the decoding resource allocator 600 may allocate 80% of idle resources to the first display device 21 and may allocate remaining 20% to the second display device 22. The decoder 700 may display images of a plurality of channels on each display device by performing decoding by using decoding resources allocated to each display device.

Accordingly, since the apparatus 10 according to an embodiment of the present invention allocates resources in consideration of information about a display device, in particular, an operation state and a maximum display resolution of the display device, the apparatus 10 may dynamically control the amount of resources allocated to each display device. The apparatus 10 may prevent occupation of unnecessary resources by dynamically controlling resources, and furthermore, may reduce energy consumption, reduce heat generation, and increase a lifespan of the apparatus 10.

Figure 3:
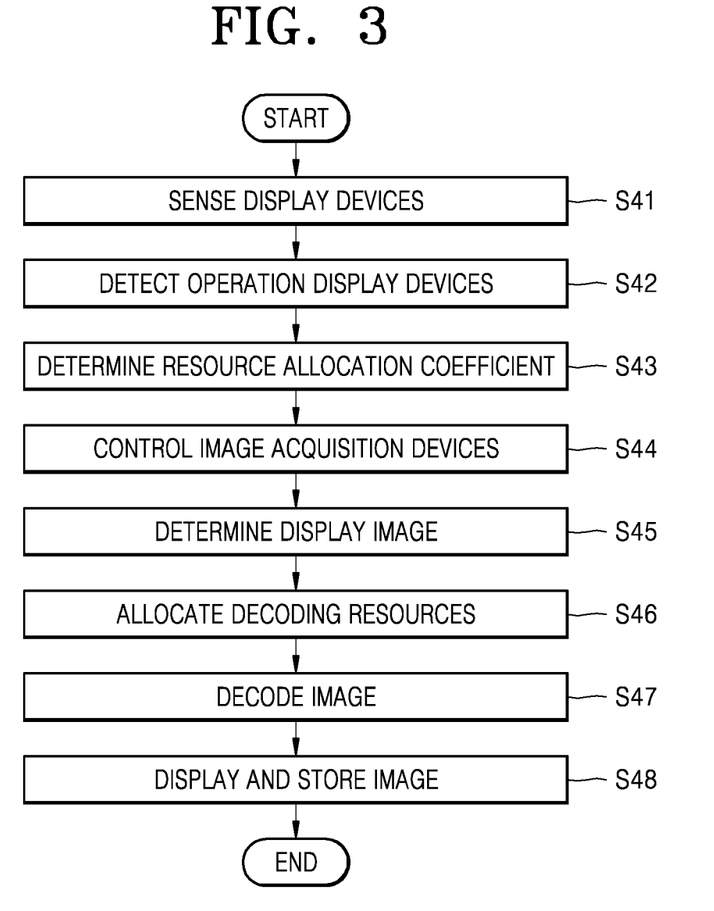
FIGS. 3 and 4 are flowcharts for explaining a method of managing display performed by the apparatus for managing display.
Figure 4:
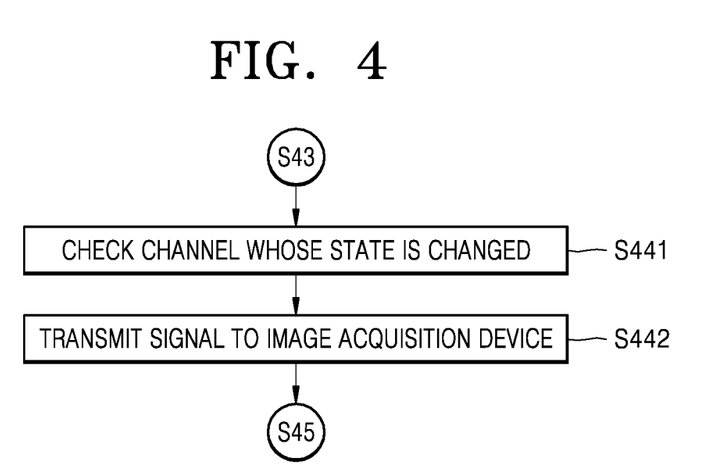

FIGS. 3 and 4 are flowcharts for explaining a method of managing display performed by the apparatus 10. The same description as that made with reference to FIGS. 1 and 2 will not be repeated.

In operation S41, the display device sensor 100 according to an embodiment of the present invention may obtain display device information including an operation state and a maximum display resolution of each of one or more connection display devices, e.g., the first through third display devices 21 through 23, that are sensed by the display device sensor 100 to be connected.

For example, when the first through third display devices 21 through 23 and the apparatus 10 are connected to each other according to an HDMI method, the display device sensor 100 may determine whether the first through third display devices 21 through 23 are connected according to whether EDID information or input information of a hot plug detect pin is received.

In FIG. 2, the display device sensor 100 may sense the first display device 21, the second display device 22, and the third display device 23 as connection display devices.

The display device sensor 100 may obtain display device information about each of the connection display devices from each of the first through third display devices 21 through 23. For example, the display device sensor 100 may obtain display device information by checking EDID of each of the first through third display devices 21 through 23. In this case, the EDID may include information about a manufacturer, a product identification mark, a color feature, a display resolution, and a operation state of each display device.

In FIG. 2, the display device sensor 100 may obtain display device information of each of the first display device 21, the second display device 22, and the third display device 23 from each of the first through third display devices 21 through 23. The display device information of each of the first through third display devices 21 through 23 may include information about an operation state and information about a maximum display resolution of each of the first through third display devices 21 through 23.

In operation S42, the operation display device detector 200 according to an embodiment of the present invention may detect one or more operation display devices that are operating display devices from among the one or more connection display devices, by referring to the display device information obtained by the display device sensor 100.

In FIG. 2, since the first display device 21 and the second display device 22 are operating and the third display device 23 is not operating as described above, the operation display device detector 200 may detect the first display device 21 and the second display device 22 as operation display devices.

In operation S43, the resource allocation coefficient determiner 300 according to an embodiment of the present invention may determine a resource allocation coefficient of each of the one or more operation display devices, by referring to the display device information of the one or more operation display devices detected by the operation display device detector 200.

In this case, the resource allocation coefficient determiner 300 may determine the resource allocation coefficient by using any of various methods. For example, the resource allocation coefficient determiner 300 may determine the resource allocation coefficient so that the resource allocation coefficient increases as a maximum display resolution of each operation display device increases.

Also, the resource allocation coefficient determiner 300 may determine the resource allocation coefficient of operation display so that the resource allocation coefficient increases as the number of channels displayed on each operation display device increases.

Furthermore, the resource allocation coefficient determiner 300 may determine the resource allocation coefficient of operation display in consideration of both a maximum display resolution of each operation display device and the number of channels displayed on each operation display device.

As such, according to the present invention, since resources are dynamically allocated in consideration of a display resolution of each operation display device and/or the number of display channels, an image having higher quality may be displayed.

When an operation of one operation display device is stopped, the resource allocation coefficient determiner 300 according to another embodiment of the present invention may minimize a resource allocation coefficient of the operation display device whose operation is stopped.

The apparatus 10 according to an embodiment of the present invention may repeatedly perform the above operation at predetermined time intervals. In other words, the display device sensor 100 according to an embodiment of the present invention may obtain display device information at predetermined time intervals. Also, the operation display device detector 200 may detect an operation display device by referring to the display device information obtained by the display device sensor 100 at predetermined time intervals. Also, the resource allocation coefficient determiner 300 may determine a resource allocation coefficient of the operation display device detected by the operation display device detector 200 at predetermined time intervals.

In operation S44, the image acquisition device controller 400 according to an embodiment of the present invention may control the image acquisition devices 31 through 35 by interoperating with each display device. In more detail, in operation S441, the image acquisition device controller 400 according to an embodiment of the present invention may check a channel displayed on at least one of a display device whose change is sensed by the display device sensor 100 and a display device whose change is sensed by the operation display device detector 200. In operation S442, the image acquisition device controller 400 may transmit a signal for controlling any of the image acquisition devices 31 through 35 that transmit an image of the checked channel to the image acquisition device.

For example, the image acquisition device controller 400 may check a channel displayed on at least one of a connection stop display device whose connection is sensed by the display device sensor 100 to be stopped and an operation stop display device whose operation is sensed by the operation display device detector 200 to be stopped. Also, the image acquisition device controller 400 may transmit a signal for stopping image transmission of an image acquisition device that transmits an image of the checked channel to the image acquisition device.

For example, it is assumed that the operation display device detector 200 detects the first display device 21 and the second display device 22 as operation display devices at a first time and the operation display device detector 200 detects only the first display device 21 as an operation display device at a second time that is later than the first time. In other words, it is assumed that the operation display device detector 200 detects the second display device 22 as an operation stop display device at the second time. Also, it is assumed that a channel of an image obtained by the image acquisition device 35 is displayed on the second display device 22 at the first time.

In this case, the image acquisition device controller 400 may check a channel of an image displayed on the second display device 22, that is, a channel on which an image obtained by the image acquisition device 35 is displayed, and may transmit a signal for stopping image transmission to the image acquisition device 35.

When the image acquisition devices 31 through 35 transmit the same image at a plurality of resolutions, the image acquisition device controller 400 may transmit a signal for stopping only transmission of an image corresponding to an image displayed on a display device.

For example, it is assumed that the image acquisition device 35 transmits an image of a first channel at a first resolution and a second resolution and the apparatus 10 displays an image of the first resolution on the second display device 22 and stores an image of the second resolution in the image storage unit 800. Also, it is assumed that the second operation display device 22 becomes at least one of a connection stop display device and an operation stop display device at a second time that is later than a first time.

In this case, the image acquisition device controller 400 may transmit a signal for stopping transmission of the image of the first resolution and the image of the second resolution and a signal for transmitting the image of the first channel at a third resolution, to the image acquisition device 35. In this case, the third resolution may be higher than the second resolution. Also, the image acquisition device controller 400 may store an image of the third resolution in the image storage unit 800.

As such, while the same image is displayed and stored, the image may not need to be displayed. In this case, resources of the apparatus 10 may be more efficiently used and an image having higher quality may be stored by increasing a resolution of storage.

The image acquisition device controller 400 may check a channel displayed on at least one of a new connection display device that is sensed by the display device sensor 100 to be newly connected and an operation start display device whose operation is sensed to start by the operation display device detector 200. Also, the image acquisition device controller 400 may transmit a signal for starting image transmission of an image acquisition device that transmits an image of the checked channel to the image acquisition device.

Accordingly, according to the present invention, resources of the apparatus 10 may be more efficiently used and a network environment may be more comfortably operated. Also, according to the present invention, since an image acquisition device is also controlled if necessary, a lifespan of the image acquisition device may be increased and electrical energy consumption may be reduced.

The display image determiner 500 according to an embodiment of the present invention may check a display resolution of a first channel in an operation display device. Also, in operation S45, the display image determiner 500 may determine an image of the first channel having a smallest resolution difference from the checked display resolution from among images of the first channel having one or more resolutions transmitted by the image acquisition devices as a display image of the first channel.

For example, it is assumed that a maximum display resolution of the first display device 21 is a UHD resolution and channels of images obtained by the image acquisition devices 31 through 34 is displayed as four quarters on the first display device 21. Also, it is assumed that the image acquisition devices 31 through 34 transmit the obtained images at a UHD resolution, a QHD resolution, and an FHD resolution.

In this case, the display image determiner 500 may check that each channel of an image obtained by each of the image acquisition devices 31 through 34 is displayed on the first display device 21 at the FHD resolution, and thus may determine that an image transmitted at the FHD resolution from among images transmitted by the image acquisition devices 31 through 34 is a display image.

As such, since the present invention interoperates with an image acquisition device, the loss of additional resources due to a change in a resolution may be avoided and deterioration of a display screen may be prevented.

In operation S46, the decoding resource allocator 600 may allocate decoding resources to be proportional to a resource allocation coefficient determined for each of the one or more operation display devices. Also, in operation S47, the decoder 700 may decode an image received from each of the one or more image acquisition devices by using the allocated decoding resources.

When "decoding resources are allocated" in the present invention, it may mean that a processor resource, a memory space, and a buffer needed to decode and display an image received from an input acquisition device on a display device are allocated.

For example, For example, it is assumed that a resource allocation coefficient of the first display device 21 is 0.8 and a resource allocation coefficient of the second display device 22 is 0.2. In this case, the decoding resource allocator 600 may allocate 80% of idle resources to the first display device 21 and may allocate remaining 20% to the second display device 22. The decoder 700 may display images of a plurality of channels on each display device by performing decoding by using decoding resources allocated to each display device.

In operation S48, the apparatus 10 according to an embodiment of the present invention may display an image received from each of the image acquisition devices 31 through 35 on the display device or may store the image in the image storage unit 800.

Accordingly, since the apparatus 10 according to an embodiment of the present invention allocates resources in consideration of information about a display device, in particular, an operation state and a maximum display resolution of the display device, the apparatus 10 may dynamically control the amount of resources allocated to each display device. The apparatus 10 may prevent occupation of unnecessary resources by dynamically controlling resources, and furthermore, may reduce energy consumption, reduce heat generation, and increase a lifespan of the apparatus 10.

A method of managing display according to an embodiment of the present invention may be embodied as computer-readable code in a computer-readable recording medium. The computer-readable recording medium may be any recording apparatus capable of storing data that is read by a computer system. Examples of the computer-readable recording medium include read-only memories (ROMs), random-access memories (RAMs), compact disc (CD)-ROMs, magnetic tapes, floppy disks, and optical data storage devices. Also, the computer-readable recording medium may be distributed among computer systems that are interconnected through a network, and computer-readable code may be stored and executed in the distributed system. Functional programs, code, and code segments for embodying the present invention may be easily derived by programmers in the technical field to which the present invention pertains.

While one or more embodiments have been described with reference to the attached drawings, it will be understood by one of ordinary skill in the art that various changes in form and details may be made therein without departing from the spirit and scope of the present invention as defined by the following claims.

The invention claimed is:

1. A method of managing display, the method comprising:
obtaining display device information comprising an operation state and a maximum display resolution of each of one or more connected display devices that are sensed to be connected;
detecting one or more operating display devices, which are determined to be operating, from among the one or more connected display devices, based on the display device information; and
determining a resource allocation coefficient of each of the one or more operating display devices, based on at least one of the maximum display resolution of the each of the one or more operating display devices and a number of display channels of the each of the one or more operating display devices,
after the determining of the resource allocation coefficient, determining a channel displayed on at least one stopped display device, wherein the at least one stopped display device comprises at least one from among a connected device whose connection is sensed to be stopped, and an operating display device whose operation is detected to be stopped;
identifying an image acquisition device, from among a plurality of image acquisition devices, transmitting an image of the determined channel; and
transmitting, to the image acquisition devices, a signal for the identified image acquisition device to stop image transmission.

2. The method of claim 1, after the determining of the resource allocation coefficient, the method further comprising:
allocating decoding resources to the each of the one more operating display devices to be proportional to the determined resource allocation coefficient; and
decoding images received from one or more image acquisition devices, from among the image acquisition devices, using the decoding resources.

3. The method of claim 1, wherein the determining of the resource allocation coefficient comprises determining the resource allocation coefficient so that the resource allocation coefficient increases as the maximum display resolution of the each of the one or more operating display devices increases.

4. The method of claim 1, wherein the determining of the resource allocation coefficient comprises determining the resource allocation coefficient to be larger as the number of display channels of the each of the one or more operating display devices increases.

5. The method of claim 1, wherein the obtaining of the display device information comprises obtaining the display device information at predetermined time intervals,
the detecting of the one or more operating display devices comprises detecting the one or more operating display devices by referring to the display device information obtained at the predetermined time intervals, and
the determining of the resource allocation coefficient comprises determining the resource allocation coefficient of the each of the one or more operating display devices detected at the predetermined time intervals.

6. The method of claim 5, after the determining of the resource allocation coefficient, the method further comprising controlling image acquisition devices,
wherein the controlling of the image acquisition devices comprises:
checking a channel displayed on at least one of a new connected display device that is sensed to be newly connected in the obtaining of the display device information and an operation start display device whose operation is detected to start in the detecting of the one or more operating display devices; and
transmitting a signal for starting image transmission of the image acquisition device that transmits an image of the determined channel to the image acquisition device.

7. The method of claim 1, wherein the image acquisition device transmits an image of a first channel at a first resolution and a second resolution, and
after the determining of the resource allocation coefficient, the method further comprises displaying an image of the first resolution on a first operating display device and storing an image of the second resolution in an image storage unit.

8. The method of claim 7, wherein when the first operating display device is the at least one stopped display device,
the transmitting of the signal for stopping the image transmission to the image acquisition devices comprises transmitting a signal for stopping transmission of the image of the first resolution and the image of the second resolution, and a signal for transmitting the image of the first channel at a third resolution,
wherein the storing in the image storage unit comprises storing an image of the third resolution in the image storage unit,
wherein the third resolution is higher than the second resolution.

9. The method of claim 1, wherein the image acquisition device transmits an image of a first channel at one or more resolutions,
wherein after the determining of the resource allocation coefficient, the method further comprises determining a display image,
wherein the determining of the display image comprises:
checking a display resolution of the first channel in the each of the one or more operating display devices; and
determining an image of the first channel having a smallest resolution difference from the display resolution from among images of the first channel having the one or more resolutions as a display image of the first channel.

10. The method of claim 1, wherein the signal indicates to the identified image acquisition device to stop transmission of all images.

11. A method of managing display, the method comprising:
obtaining display device information comprising an operation state and a maximum display resolution of each of one or more connection display devices that are sensed to be connected;
detecting one or more operation display devices that are operating display devices from among the one or more connection display devices, by referring to the display device information; and
determining a resource allocation coefficient of each of the one or more operation display devices, based on at least one of the maximum display resolution of each of the one or more operation display devices and a number of display channels of each of the one or more operation display devices, wherein the obtaining of the display device information comprises obtaining the display device information at predetermined time intervals, the detecting of the one or more operation display devices comprises detecting the one or more operation display devices by referring to the display device information obtained at the predetermined time intervals, the determining of the resource allocation coefficient comprises determining the resource allocation coefficient of each of the one or more operation display devices detected at the predetermined time intervals, after the determining of the resource allocation coefficient, the method further comprising controlling a plurality of image acquisition devices, and wherein the controlling of the image acquisition devices comprises:

checking a channel displayed on at least one of a connection stop display device whose connection is sensed to be stopped in the obtaining of the display device information and an operation stop display device whose operation is detected to be stopped in the detecting of the one or more operation display devices;

identifying one or more image acquisition devices, from among the image acquisition devices, transmitting an image of the checked channel; and transmitting a signal for the identified one or more image acquisition devices to stop image transmission to the identified one or more image acquisition devices.

12. An apparatus for managing display, the apparatus comprising at least one processor configured to implement:

a display device sensor configured to obtain display device information comprising an operation state and a maximum display resolution of each of one or more connected display devices that are sensed to be connected;

an operating display device detector configured to detect one or more operating display devices which are determined to be operating from among the one or more connected display devices, based on the display device information;

a resource allocation coefficient determiner configured to determine a resource allocation coefficient of the each of the one or more operating display devices, based on at least one of a maximum display resolution of the each of the one or more operating display devices and a number of display channels of the each of the one or more operating display devices; and an image acquisition device controller configured to, after the determining of the resource allocation coefficient, determine a channel displayed on at least one stopped display device, wherein the at least one stopped display device comprises at least one from among a connected device whose connection is sensed to be stopped, and an operating display device whose operation is detected to be stopped, to identify an image acquisition device, from among a plurality of image acquisition devices, transmitting an image of the determined channel and to transmit, to the image acquisition devices, a signal for the identified image acquisition device to stop image transmission.

13. The apparatus of claim 12, further comprising:

a decoding resource allocator configured to allocate decoding resources to the each of the one or more operating display devices to be proportional to the determined resource allocation coefficient; and a decoder configured to decode images received from one or more image acquisition devices, from among the image acquisition devices, by using the decoding resources.

14. The apparatus of claim 12, wherein the resource allocation coefficient determiner is further configured to determine the resource allocation coefficient so that the resource allocation coefficient increases as the maximum display resolution of the each of the one or more operating display devices increases.

15. The apparatus of claim 12, wherein the resource allocation coefficient determiner is further configured to determine the resource allocation coefficient so that the resource allocation coefficient increases as the number of display channels of the each of the one or more operating display devices increases.

16. The apparatus of claim 12, wherein the display device sensor is further configured to obtain the display device information at predetermined time intervals, the operating display device detector is further configured to detect the one or more operating display devices by referring to the display device information obtained at the predetermined time intervals, and the resource allocation coefficient determiner is further configured to determine the resource allocation coefficient of the each of the one or more operating display devices detected at the predetermined time intervals.

17. The apparatus of claim 16, wherein the image acquisition device controller is further configured to check a channel displayed on at least one of a new connected display device that is sensed by the display device sensor to be newly connected and an operation start display device whose operation is detected to start by the operating display device detector, and transmit a signal for starting image transmission of any of the image acquisition devices that transmits an image of the determined channel to the image acquisition device.

18. The apparatus of claim 12, wherein the image acquisition device transmits an image of a first channel at a first resolution and a second resolution, wherein the apparatus displays an image of the first resolution on a first operating display device and stores an image of the second resolution in an image storage unit.

19. The apparatus of claim 18, wherein when the first operating display device is the at least one stopped display device, the image acquisition device controller is further configured to transmit a signal for stopping transmission of the image of the first resolution and the image of the second resolution and a signal for transmitting the image of the first channel at a third resolution, wherein the apparatus stores an image of the third resolution in the image storage unit, wherein the third resolution is higher than the second resolution.

20. The apparatus of claim 12, wherein the image acquisition device transmits an image of a first channel at one or more resolutions, wherein the apparatus further comprises a display image determiner configured to check a display resolution of the first channel in the each of the one or more operating display devices, and determine an image of the first channel having a smallest resolution difference from the display resolution from among images of the first channel having the one or more resolutions as a display image of the first channel.

\* \* \* \* \*